United States Patent [19]

Fujii et al.

[11] Patent Number: 4,561,701
[45] Date of Patent: Dec. 31, 1985

[54] TANDEM SOLENOID VALVE ASSEMBLY INCLUDING PLURAL VALVE SECTIONS

[75] Inventors: Etsuo Fujii; Makoto Satoh, both of Saitama; Mitsuo Toyoda, Tokyo, all of Japan

[73] Assignee: Honda Giken Kogyo Kabushiki Kaisha, Tokyo, Japan

[21] Appl. No.: 541,731

[22] Filed: Oct. 13, 1983

[30] Foreign Application Priority Data

| Nov. 20, 1982 | [JP] | Japan | 57-175849[U] |
| Nov. 20, 1982 | [JP] | Japan | 57-175850[U] |
| Nov. 20, 1982 | [JP] | Japan | 57-175851[U] |
| Nov. 20, 1982 | [JP] | Japan | 57-175852[U] |

[51] Int. Cl.⁴ .................... B60T 8/02; F16K 31/02
[52] U.S. Cl. .................... 303/119; 251/30.01; 251/129.15; 137/870
[58] Field of Search .................... 303/119, 10–12, 303/68–69, 116, 113, 61–63; 188/181; 251/129, 30, 130–141; 137/870

[56] References Cited

U.S. PATENT DOCUMENTS

| 3,617,098 | 11/1971 | Leiber | 303/119 |
| 3,893,693 | 7/1975 | Skoyles | 303/119 |
| 4,368,759 | 1/1983 | Akagi | 137/870 X |

FOREIGN PATENT DOCUMENTS

| 46-33460 | 9/1971 | Japan . |
| 46-33461 | 9/1971 | Japan . |
| 49-26220 | 7/1974 | Japan . |
| 49-70225 | 7/1974 | Japan . |
| 49-83028 | 8/1974 | Japan . |
| 50-104425 | 8/1975 | Japan . |
| 53-43231 | 4/1978 | Japan . |
| 53-50533 | 5/1978 | Japan . |

Primary Examiner—Douglas C. Butler
Attorney, Agent, or Firm—Wenderoth, Lind & Ponack

[57] ABSTRACT

A solenoid valve assembly includes an inner valve section and an outer valve section incorporated integrally in a symmetrical relationship with respect to each other in the interior of a single casing. A common hydraulic fluid passage extends through both valve sections.

5 Claims, 4 Drawing Figures

TANDEM SOLENOID VALVE ASSEMBLY INCLUDING PLURAL VALVE SECTIONS

BACKGROUND OF THE INVENTION

1. Field of the Invention

The present invention relates in general to a solenoid valve, and more particularly to improvements in or relating to a solenoid valve which is most suitable for use in an anti-lock braking system.

2. Description of the Prior Art

In general, it is known that, with the use of an anti-lock braking system in a passenger carrying vehicle which operates at a relatively high speed, the rotating velocity of the vehicle wheels is detected by way of a revolution velocity sensor, and the thus obtained speed data is electronically differentiated to provide a wheel acceleration signal at an electronic control section. In accordance with this wheel acceleration signal, there is determined a sign or transient symptom of a tendency of a wheel or wheels of the vehicle to become locked when the brakes are applied during cruising of the vehicle at a relatively high speed. Upon such determination, a suitable operating command is given to a modulator or hydraulic regulating mechanism, so that a suitable counter operation to ensure maneuverability or operating stability of the vehicle may be taken quickly, and braking force is applied in such a manner that the vehicle wheels are allowed to slip to an appropriate extent, so that the vehicle may positively be stopped within the shortest possible braking distance.

In such a typical construction of the anti-lock braking system as stated above, it is generally known that there is incorporated a certain control means such as a pair of normally-opening and normally-closed solenoid valves, each of which solenoid valves is adapted to be opened or closed individually for the purpose of regulating the hydraulic brake force by providing a hydraulic pressure modulator with a hydraulic brake regulating pressure or by relieving this hydraulic regulating pressure to a hydraulic pressure reservoir.

The present invention relates to the provision of a solution to the maintenance and security of the proper hydraulic braking pressure regulation of the hydraulic pressure modulator or pressure regulating mechanism in the hydraulic braking system as experienced in the conventional hydraulic braking system.

SUMMARY OF THE INVENTION

It is therefore a primary object of the present invention to provide an improved hydraulic pressure regulation means for use in an anti-lock braking system, which enables efficient assembly of a pair of solenoid valves incorporated into an anti-lock brake system as stated above.

According to the present invention, there is provided an improved solenoid valve assembly which comprises inner valve means and outer valve means incorporated integrally in an symmetrical relationship with respect to each other in the interior of single casing, and having common hydraulic fluid passage means extending therethrough.

The principle, nature and details of the present invention, as well as advantages thereof, will become more apparent from the following detailed description of a preferred embodiment of the invention, when read in conjunction with the accompanying drawings, in which like parts are designated by like reference numerals.

DETAILED DESCRIPTION OF THE INVENTION

The present invention will now be described in detail by way of example of a preferred embodiment thereof in conjunction with the accompanying drawings.

Figure 1:
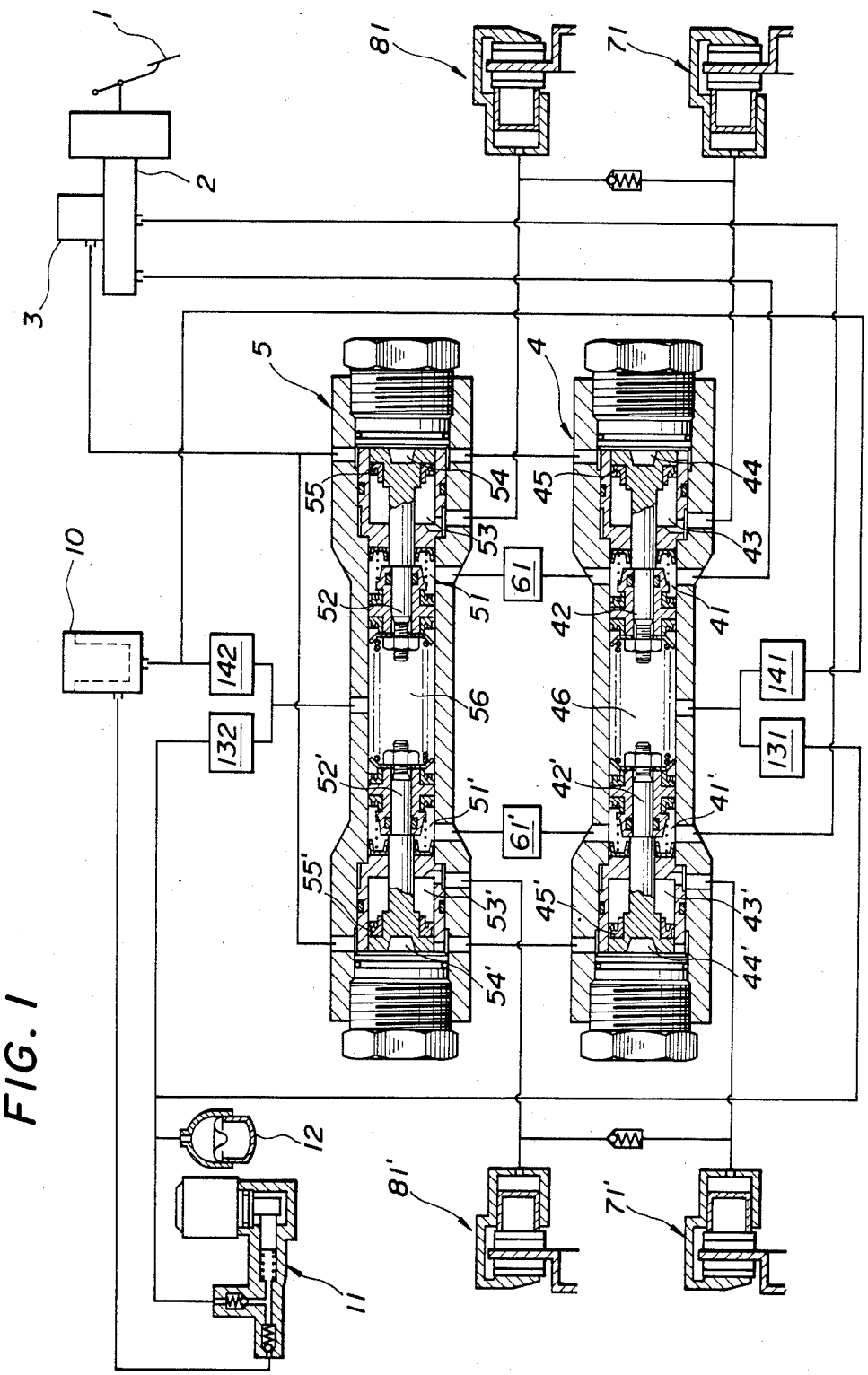
FIG. 1 is a schematic circuit diagram, partly in block representation, which shows a preferred embodiment of a hydraulic operating system for use in an anti-lock braking system.

Now, referring to FIG. 1, there is shown the preferred embodiment of an improved hydraulic operating system for use in the anti-lock braking system according to the present invention, in which there are provided a brake pedal 1, a tandem type master brake cylinder 2, a first hydraulic pressure modulator 4 including primary hydraulic fluid chambers 41, 41', a second hydraulic pressure modulator 5 including primary hydraulic fluid chambers 51, 51', and hydraulic pressure control valves 61, 61'. With such construction, as the brake pedal 1 is depressed, the primary hydraulic fluid chambers 41, 41' in the primary hydraulic pressure modulator 4 are charged with the hydraulic operating fluid under braking pressure from the master brake cylinder 2, and then the hydraulic operating fluid is also directed to the primary hydraulic fluid chambers, 51, 51' of the second hydraulic pressure modulator 5 through the primary hydraulic pressure modulator 4 and the hydraulic pressure control valves 61, 61', respectively. When the pressure of the hydraulic operating fluid is relayed to he primary hydraulic fluid chambers 41, 41' of the hydraulic pressure modulator 4, hydraulic pistons 42, 42' are caused to move toward each other, thus transmitting the hydraulic braking force to secondary hydraulic pressure chambers 43, 43', and right and left front wheel brakes 71, 71' of the vehicle are respectively caused to operate in braking action in accordance with the hydraulic pressure output from each of the secondary hydraulic pressure chambers 43, 43'. Similar operation occurs likewise with regard to the second hydraulic pressure modulator 5. That is, as each of hydraulic pistons 52, 52' is caused to travel toward each other, thus transmitting the hydraulic braking force to secondary hydraulic pressure chambers 53, 53', right and left rear wheel brakes 81, 871' of the vehicle are respectively caused to operate in braking action in accordance with the hydraulic pressure output from each of the secondary hydraulic fluid pressure chambers 53, 53'. Also, on the rear part of each of the hydraulic pistons 42, 42' and 52, 52' of the hydraulic pressure modulators 4 and 5, respectively, there are provided respective relieved hydraulic fluid chambers 44, 44' and 54, 54'. The relieved hydraulic fluid chambers 44, 44' of modulator 4 are connected with relieved hydraulic fluid chambers 54, 54' of hydraulic pressure modulator 5, respectively, by lines 15, 15', respectively, and relieved hydraulic fluid chambers 54, 54' of the second hydraulic pressure modulator 5 are connected to the reservoir 3 of the master brake cylinder 2. Cup-shaped sealing members 45, 45' and 55, 55', respectively, are mounted integrally on sides of each of the hydraulic pistons 42, 42' and 52, 52'. Such sealing members partition each of the relieved hydraulic fluid chambers 44, 44' and 54, 54' from the respective secondary hydraulic pressure chambers 43, 43' and 53, 53', in a manner such that the hydraulic operating fluid is allowed to pass from each of the relieved hydraulic fluid chambers 44, 44' and 54, 54' to the respective secondary hydraulic pressure chambers 43, 43' and 53, 53', but is prevented from leaking in the opposite direction.

Also, hydraulic operating fluid delivered from a reservoir 10 for the anti-lock braking control is once pressurized by way of a hydraulic pump 11 and accumulated preliminarily in a hydraulic accumulator 12, so that the thus accumulated fluid can be supplied to each of anti-lock braking fluid control chambers 46, 56 of the hydraulic pressure modulators, 4, 5 through normally closed type solenoid valves (inner valve elements) 131, 132, respectively. Further, each of the anti-lock braking fluid control chambers 46, 56 is operatively connected to the reservoir 10 through normally closed type solenoid valves (outer valve elements) 141, 142, respectively. In this connection, it is noted that each of these solenoid valve elements 131, 132 and 141, 142 is designed to be driven to open and close respectively in accordance with a driving command from an electronic control section, not shown, in such a manner that the solenoid valves 131, 132 are caused to be opened and the solenoid valve elements 141, 142 closed during an anti-lock braking operation, while each of these solenoid valve elements 131, 132 and 141, 142 is caused to return its normal position during a non-braking or normal cruising operation of the vehicle, respectively.

According to the construction of the anti-lock braking system as stated hereinbefore, when the primary hydraulic fluid chambers 41, 41' and 51, 51' of the hydraulic pressure modulators 4 and 5 are subjected to hydraulic braking pressure so that each of the front and rear wheel brakes 71, 71' and 81, 81' is operated to perform braking action by the hydraulic output from secondary hydraulic pressure chambers 43, 43' and 53, 53', respectively, and when a command for anti-lock braking operation is given from the electronic control section of the vehicle, the outer valve elements 141, 142, which have thus far been in the open position connecting anti-lock braking fluid control chambers 46, 56 of the hydraulic pressure modulators 4, 5 and the reservoir 10, are then closed and inner valve elements 131, 132 are then opened. As a result, hydraulic operating fluid under pressure (at a level higher due to the braking pressure) is then delivered from pump 11 into the anti-lock braking fluid control chambers 46, 56 of the hydraulic pressure modulators 4, 5 through the outer valve elements 131, 132. Accordingly, each of the hydraulic pistons 42, 42' and 52, 52' is urged backwardly toward its original position, thus achieving regulation of the braking pressure.

Figure 2:
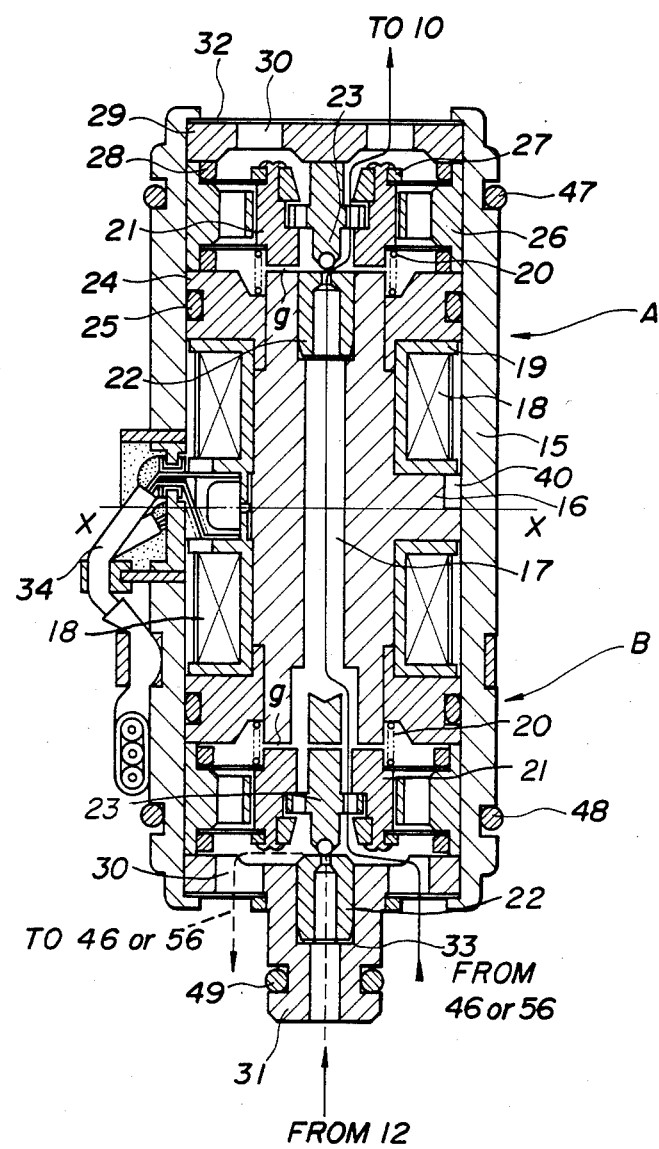
FIG. 2 is an elevational view, in vertical cross-section, showing a preferred embodiment of a solenoid valve assembly which incorporates an inner valve element and an outer valve element assembled as a unit according to a preferred embodiment of the present invention.

Next, referring to FIG. 2, there is shown the general construction of the solenoid valve assembly, wherein there are incorporated an inner valve section B and an outer valve section A as a unit, which are disposed symmetrically in the vertical direction with respect to a central line X-X, and which present a unitary construction of a paired or dual solenoid valve assembly.

Each of the inner valve section B and the outer valve section A comprises an energizing winding 18 would around a bobbin 19 which is mounted on a core 16 having a center hydraulic fluid passageway 17, the core 16 being securely mounted in the interior of a casing 15, an armature (moving iron core) 21 positioned within casing 15 with an end facing a respective end surface of the core 16 with a gap "g" therebetween and maintained by a coil spring 20, a valve seat 22 located adjacent one end of the hydraulic operating fluid passage 17 (outer valve section A) or spaced from the other end of passage 17 (inner valve section B), and a valve head 23 positioned concentrically with respect to the armature 21 so as to cooperate with the valve seat 22. In such construction of the solenoid valve assembly, it is noted that the inner valve section B comprises a normally-closed type valve formed by the respective valve seat 22 and the valve head 23, while the outer valve section A comprises a normally-opened type valve formed by the respective valve seat 22 and the valve head 23. In FIG. 2, there is shown a collar designated at the reference numeral 24 upon which an oil seal ring 25 is mounted, a yoke 26, ring stoppers 27, 28 and a valve stopper 29. A hydraulic fluid outlet port or hole 30 is formed in each valve stopper 29 for discharging the hydraulic operating fluid. When outer valve section A is closed and inner valve section B is open, the hydraulic operating fluid is discharged from the hydraulic fluid outlet hole 30 of section B and is directed (as shown by dashed lines in FIG. 2) to the anti-lock braking fluid control chamber 46 or 56 of the hydraulic pressure modulator 4 or 5. When the inner valve section B is closed and outer valve section A is open, hydraulic operating fluid enters hole 30 of section B from chamber 46 or 56 and is discharged from the hole 30 of section A and is directed to the reservoir (as shown by solid lines in FIG. 2). The valve stopper 29 of the inner valve section B is formed integrally with a suction joint or fluid inlet 31 which is adapted to direct the hydraulic operating fluid delivered under pressure from the accumulator 12 into the valve when section B is open. In addition, there are provided a filter 32 over the hydraulic fluid hole 30 on the outside of each valve stopper 29, and a filter 33 over each valve seat 22. In the drawing, there is illustrated a lead wire 34 connected to energizing coils 18 and which extends externally to be connected with an electronic control section, not shown.

Now, referring to the operation of the solenoid valve assembly of such construction, when each of the energizing coils 18 in the inner valve section B and the outer valve section A is respectively in its de-energized state, each valve element is in the position shown in FIG. 2, that, the inner valve section B is closed and the outer valve section A opened, thus blocking the high pressure hydraulic system from the accumulator 12, and providing hydraulic fluid communication through both inner valve section B and outer valve section A, as shown by the solid line arrow, between the reservoir 10 and the anti-lock braking fluid control chamber 46 or 56 of the hydraulic pressure modulator 4 or 5. On the other hand, when the energizing coils 18 are energized, the armatures 21 are attracted toward the cores 16 by the thus generated electro-magnetic force against the force of coil springs 20, whereupon the valve element of the inner valve section B is now caused to be opened and the valve element of the outer valve section A is closed. This results in blocking of the communication between the reservoir 10 and the anti-lock braking fluid control chamber 46 or 56 of the hydraulic pressure modulator 4 or 5, and instead produces another hydraulic fluid route, as shown by the dashed line arrow, for directing the hydraulic operating fluid under pressure from the accumulator 12 to the anti-lock braking fluid control chamber 46 or 56.

Due to the construction of the inner valve section B and the outer valve section A disposed in an in-line tandem relationship with respect to each other and symmetrically with respect to the line X-X in the interior of the casing 15, it is possible for the core 16 for both valve elements to be common, thus providing a common hydraulic fluid line extending therebetween. By virtue of such construction, it is possible to make the entire valve assembly of simple construction, and also to have the two valve elements, which operate opposite in valving action directions with respect to each other, incorporated in a limited space within the casing. Furthermore, with such a highly compact arrangement of the solenoid valve assembly, it is to be noted that there is successfully attained the integration of the hydraulic fluid system adapted to operatively intercommunicate such members of the assembly as the reservoir 10, the accumulator 12 and the hydraulic pressure modulator 4 or 5, thus making more efficient assembly and maintenance operations. Also, owing to the vertical tandem arrangement of such elements of the valve assembly, as noted above, any air entrapped in the interior of the solenoid valve assembly will automatically be led smoothly upwardly. Otherwise, such air would stay within the assembly and possibly cause an undesired state of vapor lock or the like in the hydraulic system.

Again, referring to the construction of the solenoid valve assembly according to the present invention shown in FIG. 2, it is arranged that, in connection with the notably advantageous vertical tandem arrangement of the inner valve section B and the outer valve section A within the casing 15, enabling the provision of the common hydraulic fluid passageway 17 which operatively leads to the reservoir 10, there is provided a shouldered portion 40 projecting radially inwardly at the central section of the casing 15, the core 16 nesting in abutment with this shouldered portion 40 within the casing 15. With such construction, when the inner valve section B is opened and the outer valve section A closed, part of the hydraulic pressure (on the order from 200 to 230 Kg/mm$^2$) of the hydraulic operating fluid introduced from the accumulator 12 into the casing 15 can be received by the casing 15 through the armature 21 and the core 16 of the solenoid valve assembly. In this respect, it is needless to mention that the casing 15 is made of a material which can resist the substantial pressure which otherwise might cause deformation or a breakage thereof.

By virtue of such construction that part of the pressure of the hydraulic operating fluid introduced into the casing 15 can be relieved or absorbed by the casing 15 itself, it is now possible in practice to prevent possible breakage of the constructional elements incorporated in the inner valve section B and the outer valve section A resulting from an excessive surge of pressure. Referring more specifically to the route of pressure transmission of the whole valve assembly, and to FIG. 3, the majority of the hydraulic pressure, less the part absorbed by the casing 15, is eventually applied to a base 39 through a valve head 37 and stud bolts 38 after having worked in the interior of the valve assembly. Accordingly, each of the complete solenoid valve assemblies 35 and 36 is mounted securely on the base 39 with a greatest possible strength.

Figure 3:
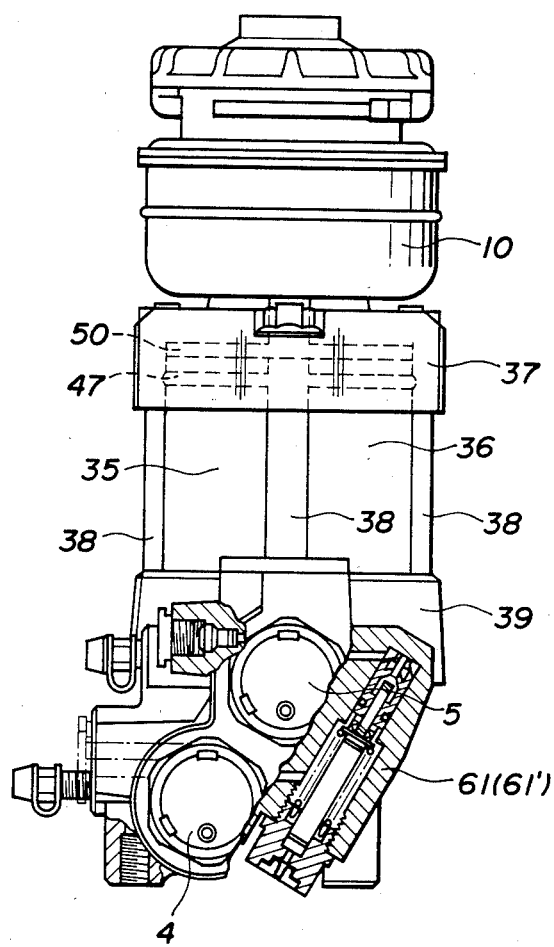
FIG. 3 is an elevational view, partly in cross section, showing the relationship of installation of a reservoir, a valve head, a solenoid valve complete and a base, wherein the solenoid valve complete is securely mounted upon the base of a valve assembly.
Figure 4:
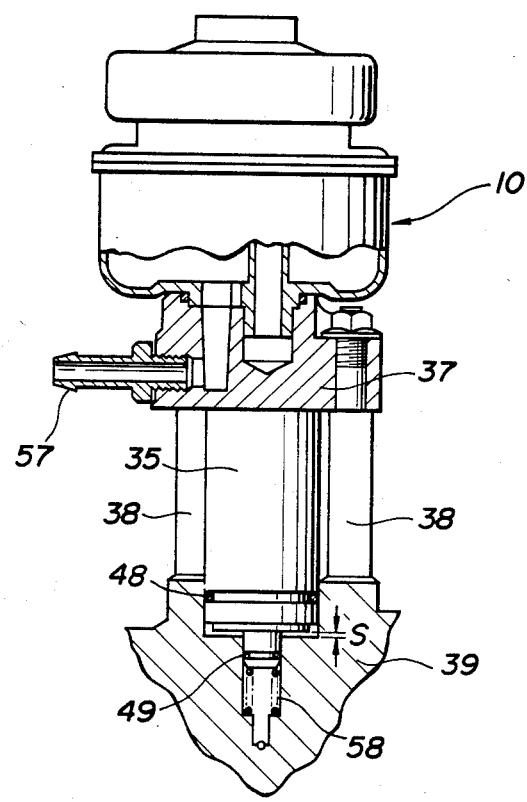
FIG. 4 is a side elevational view of the reservoir, valve head, solenoid valve complete and base portion of the solenoid valve assembly, showing, partly in cross-section, the state that the solenoid valve complete is mounted upon the base and the reservoir is mounted onto the valve head, respectively.

Also, according to the present invention, it is advantageous that, when mounting the solenoid valve assembly 35 or 36 which incorporates as a unit the inner valve section B and the outer valve section A upon the base 39, the pair of solenoid valve elements 131, 141 are incorporated integrally into assembly 35, and the pair of solenoid valve elements 132, 142 are incorporated integrally into assembly 36, and that such assemblies are secured to the base 39 through the common valve head 37 by using the stud bolts 38. More specifically, according to the present invention, the reservoir 10 is mounted on the common valve head 37, and a hydraulic fluid line 50 is formed to connect the hydraulic fluid holes 30 of the solenoid valve assemblies 35, 36 within the common valve head 37, thus connecting directly the solenoid valve assembly 35, 36 and the reservoir 10, without the use of hoses. In FIG. 4, illustrating the manner of mounting the reservoir 10 on the common valve head 37 and the manner of mounting the solenoid valve assemblies 35, 36 on the base 39, referencwe numeral 457 designates a suction joint or connection which leads to the hydraulic pump 11. Also, as typically shown in FIG. 2, there are provided O-rings 47, 48 at the upper and lower ends of each of the casings 15 of the solenoid valve assemblies 35, 36, and also there is provided an O-ring 49 at the suction joint or inlet 31, thus assuring a fluid tight connection when installing each of the solenoid valve assemblies 35 and 36 in the base 39 and the common valve head 37, as shown in FIG. 4. Furthermore, as shown in FIG. 3, there are mounted integrally the hydraulic pressure modulators 4, 5 and the hydraulic fluid control valves 61, 61' on the side of the base 39.

Also, according to this specific embodiment of the present invention as shown in FIG. 4, each of the solenoid valve assemblies 35 and 36 is mounted in position in the base 39 in a manner such that the lower end of the inlet 31 of each of the solenoid valve assemblies 35 and 36 is supported by a coil spring 58 in a so-called floating fashion in the base 39. In this manner, it is possible in practice to absorb a possible dimensional error "S" in terms of the height or depth in the installation of the solenoid valve assemblies 35, 36, thus making it possible to secure these valve assemblies without any undesired forced installating conditions. It is of course acceptable that each of the solenoid valve assemblies 35 and 36 may also be suspended by a coil spring from the common valve head 37 rather than the base 39.

It is an advantage of the improved construction of the solenoid valve assembly according to the present invention that the inner valve section, adapted to supply the hydraulic operating fluid under pressure to the anti-locking control fluid chamber of the hydraulic pressure modulator incorporated in the anti-lock braking system, and the outer valve section, adapted to relieve the hydraulic operating fluid within the anti-locking control fluid chamber into the reservoir, are assembled in integral combination and in a symmetrical relationship with respect to each other within a single casing, so that there is formed a common hydraulic fluid passageway across both valve elements, and that the paired valve sections are efficiently incorporated with the additional effect of compactness and consolidation of the hydraulic operating system within a limited given space.

Also, advantages of the improved solenoid valve assembly according to the present invention are that, since the inner valve section and the outer valve section are incorporated together within the single casing, the cores of the two sections may be formed commonly therein, and such single core may be in engaging relationship with a shouldered portion formed in the casing, so that part of the hydraulic pressure introduced into the interior of the casing when the valve is opened may be absorbed by the casing itself, whereby the valve elements may efficiently be protected from damage which might occur during the anti-locking operation of the anti-lock braking system.

A further advantage of the improved solenoid valve assembly according to the present invention is that, since the inner and outer valve sections are arranged in vertical tandem relationship with respect to each other integrally within the single casing, a common hydraulic fluid passageway may be formed to extend to each of the chambers of the anti-lock braking system through a valve head securely mounted on the base by way of stud bolts, the reservoir may be mounted on the valve head, and the common hydraulic fluid passageway may be formed to connect the hydraulic fluid inlet of each solenoid valve assemblies and the reservoir are operatively connected directly without hoses.

A further advantage of the improved solenoid valve assembly according to the present invention is that each solenoid valve assembly may be mounted in suspension or in floating fashion by a coil spring from the common valve head or the base of the assembly, whereby dimensional errors in the heights or depths of the solenoid valve elements during installation thereof may efficiently be absorbed.

Various changes and modifications may be made to the specifically described features without departing from the spirit and scope of the invention, and it is intended that the foregoing description and accompanying drawings be interpreted as illustrative and not in any way limiting to the scope of the invention.

It also is to be understood that the appended claims are intended to cover all generic and specific features particularly to the invention as disclosed herein and all statements relating to the scope of the invention, which as a matter of language might be said to fall thereunder.

What is claimed is:

1. A solenoid valve assembly for use in an anti-lock braking system of the type including a modulator having an anti-lock control fluid chamber, a source of pressurized control fluid to be supplied to the control fluid chamber during a locking preventing operation, and a reservoir to be connected to the control fluid chamber and to receive therefrom control fluid during interruption of the locking preventing operation, said assembly comprising:

a single casing having an internal shoulder;

a single core mounted within said casing in abutment with said shoulder, said core having therethrough a fluid passage;

a fluid inlet for introducing pressurized control fluid into said casing in a direction to urge said core into abutment with said shoulder;

a first port for connecting said casing to a control fluid chamber of a modulator;

a second port for connecting said casing to a reservoir;

first valve means within said casing for movement between a normal closed position blocking said inlet and an open position unblocking said inlet and providing communication between said inlet and said first port;

first means for urging said first valve to said closed position thereof;

second valve means within said casing for movement between a normal open position unblocking said fluid passage and providing connection therethrough of said first and second ports and a closed position blocking said fluid passage and preventing connection between said first and second ports;

second means for urging said second valve means to said open position thereof; and first and second solenoid coil means surrounding portions of said core adjacent said first and second valve means, respectively, for selectively simultaneously moving said first valve means to said open position thereof against said first means and moving said second valve means to said closed position thereof against said second means.

2. An assembly as claimed in claim 1, wherein said first and second means comprise respective coil springs.

3. An assembly as claimed in claim 1, wherein said second valve means is positioned within said casing vertically above said first valve means, and further comprising means for supporting said assembly in such orientation, said supporting means comprising a lower base, an upper valve head, and bolts securely mounting said assembly between said base and said valve head.

4. An assembly as claimed in claim 3, further comprising a reservoir mounted on said valve head, and fluid passage means formed in said valve head for directly connecting said reservoir to said second port.

5. An assembly as claimed in claim 3, wherein said base has formed therein a recess, a lower portion of said casing fitting within said recess, and further comprising a spring positioned within said recess and urging said casing upwardly.

* * * * *